US010626271B2

(12) United States Patent
Hoekstra et al.

(10) Patent No.: US 10,626,271 B2
(45) Date of Patent: Apr. 21, 2020

(54) ESSENTIALLY BIOBASED, THERMOFORMABLE COMPOSITION AND CONTAINERS FORMED THEREOF

(71) Applicants: HUHTAMÄKI OYJ, Espoo (FI); PURAC BIOCHEM B.V., AC Gorinchem (NL)

(72) Inventors: Aad Hoekstra, AE Zutphen (NL); Gerald G. J. Schennink, EB Wehl (NL); Sicco De Vos, JL Arnhem (NL)

(73) Assignees: HUHTAMÄKI OYJ, Espoo (FI); PURAC BIOCHEM B.V., Gorinchem (NL)

( * ) Notice: Subject to any disclaimer, the term of this patent is extended or adjusted under 35 U.S.C. 154(b) by 604 days.

(21) Appl. No.: 14/467,486

(22) Filed: Aug. 25, 2014

(65) Prior Publication Data
US 2014/0363598 A1     Dec. 11, 2014

Related U.S. Application Data

(63) Continuation of application No. PCT/EP2013/000665, filed on Mar. 7, 2013.

(30) Foreign Application Priority Data

Mar. 7, 2012 (EP) .................................. 12001550

(51) Int. Cl.
| | |
|---|---|
| B32B 1/08 | (2006.01) |
| C08L 67/04 | (2006.01) |
| B65D 1/26 | (2006.01) |
| B65D 65/46 | (2006.01) |
| C08K 3/34 | (2006.01) |
| B29C 51/00 | (2006.01) |
| B29D 22/00 | (2006.01) |
| B29K 67/00 | (2006.01) |
| B29K 509/00 | (2006.01) |
| B29L 22/00 | (2006.01) |

(52) U.S. Cl.
CPC ............ C08L 67/04 (2013.01); B29C 51/002 (2013.01); B29D 22/003 (2013.01); B65D 1/265 (2013.01); B65D 65/466 (2013.01); C08K 3/34 (2013.01); B29K 2067/046 (2013.01); B29K 2509/00 (2013.01); B29L 2022/00 (2013.01); C08L 2201/06 (2013.01); C08L 2203/30 (2013.01); C08L 2205/025 (2013.01); C08L 2205/24 (2013.01); Y02A 40/961 (2018.01); Y02W 90/12 (2015.05); Y02W 90/13 (2015.05); Y10T 428/1352 (2015.01)

(58) Field of Classification Search
CPC .... C08G 14/428; C08G 63/08; C08J 2367/04; C08J 2467/04; C08L 67/04
USPC ................. 428/480, 481, 482, 483
See application file for complete search history.

(56) References Cited

U.S. PATENT DOCUMENTS

| | | | |
|---|---|---|---|
| 2007/0032631 A1 | 2/2007 | Ouchi et al. | |
| 2007/0084822 A1* | 4/2007 | Bohen | B65D 11/04 215/382 |
| 2009/0035585 A1 | 2/2009 | Wakaki et al. | |
| 2009/0186178 A1* | 7/2009 | Ito | B29C 49/0005 428/35.7 |
| 2009/0261510 A1 | 10/2009 | De Vos | |
| 2010/0227963 A1* | 9/2010 | Hironaka | C08K 3/0033 524/451 |
| 2012/0095169 A1* | 4/2012 | Ogawa | C08L 67/04 525/450 |
| 2012/0202944 A1* | 8/2012 | Ochiai | C08L 67/04 524/539 |
| 2013/0053293 A1* | 2/2013 | Dituro | B65D 65/466 510/277 |

FOREIGN PATENT DOCUMENTS

| | | | |
|---|---|---|---|
| CA | 863673 A | * | 2/1971 |
| CN | 1860178 A | | 11/2006 |
| JP | 2005139270 A | | 6/2005 |
| JP | 2005-281331 A | | 10/2005 |
| JP | 2005281331 A | * | 10/2005 |
| JP | 2007191630 A | | 8/2007 |
| JP | 2008007736 A | | 1/2008 |

(Continued)

OTHER PUBLICATIONS

Myer Kutz, Applied Plastics Engineering Handbook Processing and Materials, 2011, William Andrew Publishing, p. 457.*

(Continued)

*Primary Examiner* — Prashant J Khatri
*Assistant Examiner* — Zachary M Davis
(74) *Attorney, Agent, or Firm* — Husch Blackwell LLP

(57) ABSTRACT

An essentially biobased and optionally biodegradable, thermoformable composition containing a) as thermoformable resin at least one poly-L-lactide with less than 1 mol % of D-lactoyl units (PLLA) or at least one poly-L-lactide with 1-5 mol % of D-lactoyl units (PLA) and b) a nucleating combination of α) 1 to 10% Wt. of at least one poly-D-lactide with less than 1 mol % of L-lactoyl-units (PDLA) or of 0.5 to 5% Wt. of PLLA/PDLA or PLA/PDLA stereocomplex crystallites, β) 0.1 to 25% Wt. of an inorganic nucleating agent, and γ) 0.1 to 30% Wt. of at least an inorganic filler with lamellar structure, and thermoformed, essentially biobased and optionally biodegradable containers formed of the inventive compositions.

18 Claims, No Drawings

(56) References Cited

FOREIGN PATENT DOCUMENTS

| | | |
|---|---|---|
| JP | 2010064301 A | 3/2010 |
| JP | WO 2011024693 A1 * | 3/2011 .............. C08L 67/04 |
| KR | 101282144 B1 | 7/2013 |
| RU | 2256673 C2 | 7/2005 |
| WO | 9001521 A1 | 2/1990 |
| WO | 9204413 A1 | 3/1992 |
| WO | 2009130205 A1 | 10/2009 |
| WO | 2010047370 A1 | 4/2010 |
| WO | WO-2011002004 A1 * | 1/2011 .............. C08L 67/04 |

OTHER PUBLICATIONS

European Search Report dated Jul. 24, 2012.
International Search Report dated May 28, 2013, dated Jun. 7, 2013.

\* cited by examiner

ESSENTIALLY BIOBASED, THERMOFORMABLE COMPOSITION AND CONTAINERS FORMED THEREOF

This application is a continuation of PCT/EP2013/000665, filed Mar. 7, 2013, which claims foreign priority benefit under 35 U.S.C. § 119 of European Patent Application 12001550.8 filed Mar. 7, 2012, the contents of all of which are incorporated herein by reference.

The present invention relates to a preferably essentially biobased and optionally biodegradable, thermoformable composition containing
a) as thermoformable, biodegradable resin at least one poly-L-lactide with less than 1 mol % of D-lactoyl units (PLLA) or at least one poly-L-lactide with from 1 mol % to 5 mol % of D-lactoyl units (PLA) and
b) a nucleating combination consisting of
α) 1 to 10% by weight, based on the total amount of the thermoformable resin a), of at least one poly-D-lactide with less than 1 mol % of L-lactoyl-units (PDLA) as component α 1) or of 0.5 to 5% by weight, based on the total amount of the thermoformable resin a), of PLLA/PDLA or PLA/PDLA stereocomplex crystallites, preferably with a molar ratio of 1:1, as component α 2),
β) 0.1 to 25% by weight, based on the total amount of the thermoformable resin a), of an inorganic nucleating agent, preferably talc, and
γ) 0.1 to 30% by weight, based on the total amount of the thermoformable resin a), of at least an inorganic filler with lamellar structure, preferably a lamellar clay mineral, and to thermoformed, essentially biobased and optionally biodegradable containers formed of the inventive compositions.

BACKGROUND OF THE INVENTION

Food containers like cups, which have to withstand temperatures around the boiling point of water, because they are used for hot drinks like tea, coffee or soup, are usually not manufactured of polylactides, although it is known that polylactides are biodegradable polymers which are decomposed by the action of microbes and enzymes into lactide acid, carbon dioxide and water.

One of the main reasons that polylactides are not suitable for the manufacturing of such cups is the low glass transition temperature of these polymers, which causes softening of the material already about 50° C., which is more than 40° C. below the application temperature of these polymers.

Another important disadvantage of polylactides are the crystallization properties of these polymers. Although homopolymers, PDLA respectively PLLA, are crystalline, the crystallization rate of these polymers is relatively slow and the polymers exhibit a behavior particularly similar to that of a non-crystalline resin.

In view of this relatively long time for crystallization, compositions containing PLA, even homopolymers, do not crystallize sufficiently during the usual short cycle times for the production of thermoformed articles, e.g. by thermoforming with moulding. Therefore, the use of these biodegradable polymers is rather disadvantageous.

Consequently, a considerable portion of food containers, especially cups for hot beverages and predominantly cups for a single use, are still manufactured of plastic resins produced from fossil sources, and not of plastic resin produced from renewable raw material, although the thermoformable PLA, PLLA and PDLA, are produced from renewable raw materials and therefore are biobased as well as biodegradable.

In order to be able to provide containers for hot beverages, especially cups for single use, manufactured of biobased and biodegradable polymers like PLLA or PLA, the above identified disadvantages of these polymers have to be overcome. Especially the need for the production of such containers, especially cups, in short cycle times has to be satisfied by increasing the rate of crystallization and the resistance against deformation at elevated temperatures, especially if such containers, especially cups, are used for hot beverages like hot coffee or tea.

Therefore, an object of the present invention was to provide thermoformable compositions containing as biobased polymers poly-L-lactide with less than 1 mol % of D-lactoyl-units (PLLA) or poly-L-lactide with from 1 mol % to 5 mol % of D-lactoyl-units (PLA), which guarantee a rate of crystallization allowing to usual short cycle times in the production of thermoformed food containers, especially cups, and the provision of such containers having excellent mechanical properties up to temperatures of 100° C.

SUMMARY

This object is solved by providing a preferably essentially biobased and optionally biodegradable, thermoformable composition containing
a) as thermoformable, biodegradable resin at least one poly-L-lactide with less than 1 mol % of D-lactoyl units (PLLA) or at least one poly-L-lactide with from 1 mol % to 5 mol % of D-lactoyl units (PLA) and
b) a nucleating combination consisting of
α) 1 to 10% by weight, based on the total amount of the thermoformable resin a), of at least one poly-D-lactide with less than 1 mol % of L-lactoyl-units (PDLA) as component α 1) or of 0.5 to 5% by weight, based on the total amount of the thermoformable resin a), of PLLA/PDLA or PLA/PDLA stereocomplex crystallites, preferably with a molar ratio of 1:1, as component α 2),
β) 0.1 to 25% by weight, based on the total amount of the thermoformable resin a), of an inorganic nucleating agent, preferably talc, and
γ) 0.1 to 30% by weight, based on the total amount of the thermoformable resin a), of at least an inorganic filler with lamellar structure, preferably a lamellar clay mineral.

A further object of the present invention is a thermoformed, essentially biobased and optionally biodegradable container formed of an inventive thermoformable composition containing
a) as thermoformable, biodegradable resin at least one PLLA or PLA and
b) a nucleating combination consisting of
α) 1 to 10% by weight, based on the total amount of the thermoformable resin a), of at least one poly-D-lactide with less than 1 mol % of L-lactoyl-units (PDLA) as component α 1) or of 0.5 to 5% by weight, based on the total amount of the thermoformable resin a), of PLLA/PDLA or PLA/PDLA stereocomplex crystallites, preferably with a molar ratio of 1:1, as component α 2),
β) 0.1 to 25% by weight, based on the total amount of the thermoformable resin a), of an inorganic nucleating agent, preferably talc, and γ) 0.1 to 30% by weight, based on the total amount of the thermoformable resin a), of at least an inorganic filler with lamellar structure, preferably a lamellar clay mineral.

DETAILED DESCRIPTION

According to the present invention the term "PLLA" means a poly-L-lactide with less than 1 mol % of D-lactoyl-units.

According to the present invention the term "PLA" means a poly-L-lactide with from 1 mol % to 5 mol % of D-lactoyl units.

According to the present invention the term "PDLA" means a poly-D-lactide with less than 1 mol % of L-lactoyl units.

The term "biodegradable" means according to the present invention that such a biodegradable polymer, copolymer or plastic resin complies with European standard EN 13432 on the compostability. This means that at least 90% of the organic carbon in the material (polymer, copolymer, plastic resin) has been converted in a test period of maximum 180 days to $CO_2$, water, energy and biomass.

The term "essentially biodegradable" means according to the present invention that at least 70% by weight of such an article (container, cups) complies with European standard EN 13432 on the compostability.

The term "biobased" means according to the present invention that an article (container, cups) is manufactured of compounds produced from renewable raw materials completely.

The term "essentially biobased" means according to the present invention that an article (cup, container) is manufactured of at least 60% by weight of the components produced from renewable materials.

The inventive thermoformable composition of which the inventive essentially biobased, thermoformed container is formed, comprises, besides the nucleating composition b), as thermoformable, biobased resin a) at least one PLLA or PLA, which PLA is preferably a copolymer consisting of L-lactoyl units and from 1 to 2.5 mol % D-lactoyl units.

Such biobased and biodegradable PLLA respectively PLA or PDLA can be produced by ring-opening polymerization of the dimers of corresponding lactic acid, which is well known in the art.

Preferably, these biobased and biodegradable polymers, PLLA or PLA, have a weight-average molecular weight of at least 30.000, more preferably at least 60.000, most preferably at least 90.000 g/mol. The weight-average molecular weight of the biodegradable polymers PLLA is preferably at most 300.000 g/mol. With the weight-average molecular weight of less than the lower limit the mechanical properties such as stiffness and elastic modulus of inventive containers formed of inventive compositions become insufficient and by contrast by exceeding the upper limit the molding processability of the inventive thermoformable composition becomes insufficient.

The inventive, thermoformable compositions used for the production of the inventive thermoformed, essentially biobased and optionally biodegradable containers comprise a nucleating composition b) consisting of three components α), β) and γ) which guarantees not only a sufficient high rate of crystallization combined with a thereof independent, broad window for thermoforming and consequently a sufficient high thermoforming speed with short cycle times, but also a sufficiently high resistance against deformation up to a temperature of 100° C. by maintaining sufficient stiffness for the use of the inventive containers, preferably of cups, which are produced by thermoforming the inventive thermoformable composition containing the nucleating combination b).

As component α 1) the biobased and biodegradable polymer PDLA, that is incorporated in the inventive thermoformable composition in an amount of 1 to 10%, preferably 1 to 6% by weight, based on the total amount of the thermoformable resin a), is a poly-D-lactide, which is a copolymer consisting of D-lactoyl units and less than 1 mol % of L-lactoyl units as already defined. The weight-average molecular weight of the PDLA is preferably in the range disclosed already before for the thermoformable resin PLLA. However, preferably, the weight-average molecular weight of the PDLA used is different to the weight-average molecular weight of PLLA used.

As component α 2), instead of the component α 1), stereocomplex crystallites of PLLA/PDLA or of PLA/PDLA with a molar ratio of 1:1 in an amount of 0.5 to 5% by weight, preferably 1 to 3% by weight, based on the total weight of the thermoformable resin a), can be incorporated into the inventive thermoformable compositions. These stereocomplex crystallites can be produced separately before adding into the inventive thermoformable composition by melting a mixture of preferably equal amounts of PLLA and PDLA respectively PLA and PDLA above 180° C. up to 230° C., preferably up to 190° C., and then cooling the melted mixture under crystallization or by heating the thermoformable composition containing the nucleating composition b) comprising as component α) the component α 1) above the melting point of PLLA, PLA respectively PDLA and cooling the mixture under crystallization.

As further component β) of the nucleating combination b) a known inorganic nucleating agent, preferably in particulated form, especially with an aspect ratio of 1 to 150 (median particle size preferably from 0.5 to 15 μm as determined by Sedigraph technique according to ISO 13317-3), preferably in form of compacted particles, in an amount of 0.1 to 25%, preferably 1 to 20% by weight, based on the total amount of the thermoformable resin a), is present. Such agent is preferably talc used preferably in an amount of 1 to 20%, based on the total amount of the thermoformable resin a). This talc has preferably an aspect ratio of 2 to 150 (median particle size can vary from 0.5 to 15 μm determined by the before mentioned Sedigraph technique). The inorganic nucleating agent, preferably talc, is preferably provided as masterbatch in PDLA, PLLA or PLA.

This component β) of the nucleating composition has to be present if as the biobased, biodegradable, thermoformable resin a) is PLA, and is preferably present if PLLA is used, in order to achieve the necessary high crystallization velocity.

The nucleating combination b) contains also at least one inorganic filler with lamellar structure, preferably a lamellar clay, more preferably lamellar aluminum silicate, in an amount of 0.1 to 30% by weight, preferably 10 to 25% by weight, based on the total amount of the thermoformable resin a) as component γ). Preferably as lamellar aluminum silicate kaolin in a multiparticulated form, preferably in form of flakes, is incorporated into the thermoformable resin a) preferably as masterbatch in PDLA, PLLA or PLA. The component γ) is always a different compound to any inorganic nucleating compound used as component β).

The component γ), especially kaolin, surprisingly does not influence the crystallization rate, however improves the demolding velocity and the mechanical properties like stiffness at high temperatures.

A preferred embodiment of the present invention is a thermoformable, essentially biobased and optionally biodegradable composition containing
- a) as thermoformable, biodegradable resin at least one PLLA and
- b) a nucleating combination consisting of
  - α) 1 to 10% by weight, preferably 1 to 6% by weight, based on the total amount of the thermoformable resin a), of at least one PDLA as component α 1) or 0.5 to 5% by weight, preferably 0.5 to 3% by weight, based on the total amount of the thermoformable resin a), of PLLA/PDLA or PLA/PDLA stereocomplex crystallites in a molar ratio of 1:1 as component α 2),
  - β) 0.1 to 25% by weight, preferably 1 to 20% by weight, based on the total amount of the thermoformable resin a) of an inorganic nucleating agent, preferably talc, and
  - γ) 0.1 to 30% by weight, preferably 5 to 25% by weight, based on the total amount of the thermoformable resin a), of at least an inorganic filler with lamellar structure, preferably a lamellar clay mineral, more preferably kaolin.

A further preferred embodiment of the present invention is a thermoformed, essentially biobased and optionally biodegradable container formed of an inventive thermoformable composition containing
- a) as thermoformable, biodegradable resin at least one PLLA or PLA and
- b) a nucleating combination consisting of
  - α) 1 to 10% by weight, preferably 1 to 6% by weight, based on the total amount of the thermoformable resin a), of at least one PDLA as component α 1) or 0.5 to 5% by weight, preferably 0.5 to 3% by weight, based on the total amount of the thermoformable resin a), of PLLA/PDLA or PLA/PDLA stereocomplex crystallites in a molar ratio of 1:1, as component α 2),
  - β) 0.1 to 25% by weight, preferably 1 to 20% by weight, based on the total amount of the thermoformable resin a), of an inorganic nucleating agent, preferably talc and
  - γ) 0.1 to 30% by weight, preferably 5 to 25% by weight, based on the total amount of the thermoformable resin a), of at least an inorganic filler with lamellar structure, preferably a lamellar clay mineral, more preferably kaolin.

The inventive, thermoformable composition can, if desired, contain additional additives, as long as the properties of the composition are not impaired to a significant extent or not at all. Accordingly, the inventive, thermoformable composition may content UV stabilizers, heat stabilizers, anti-oxidants, flame retardants, impact modifiers, plasticizers, rheology modifiers, antistatic agents, mold release agents, lubricants or degassing agents.

The inventive, thermoformable composition containing the thermoformable resin a) and the nucleating combination b) is used for manufacturing containers, especially food containers like cups.

It is known in the art that polylactides—like all polyesters—are very sensitive to moisture. Therefore, these polymers have to be stored in packages having a barrier against moisture and, if necessary, handled under very dry conditions. Accordingly, all the components that are mixed with the polylactide resin have to be dried in order to avoid any degradation of the polylactide during the melting process of the thermoformable mixture, for example in an extruder.

In detail, for providing the inventive thermoformable compositions and for manufacturing an inventive container thereof, the thermoformable resin a) and the nucleating combination b) have to be mixed and melted under dry conditions before the molten material can be shaped into a sheet or film which solidifies. In this plasticising steps, the melting temperature should be at least 170° C., preferably 180 to 200° C., which means above the melting temperature of PDLA, PLA respectively PLLA, but below the melting temperature of stereocomplex crystallites. Therefore the upper limit of the melting temperature should not be exceeded, since stereocomplex crystallites melt about ≥230° C. and the polylactide can be impaired at higher temperatures.

As mentioned before, these stereocomplex crystallites can be formed separately by mixing equivalent amounts of PLLA and PDLA or PLA and PDLA, heating this mixture up to 190° C., above the melting temperature of these polylactide polymers, and cooling the mixture under crystallization.

It is also possible to produce the stereocomplex crystallites already distributed in the inventive composition by heating the composition containing as thermoplastic resin a) either PLLA or PLA and of the nucleating combination b) only the component α 1) and optionally the components β) and γ) up to a temperature of 190° C., cooling the composition for crystallization, admixing the components β) and γ), if necessary.

It is known that the use of the stereocomplex crystallites speeds up the crystallization rate of the thermoformable resin a) and results in shorter cycle times in the production of shaped containers.

The reasonable mould time at the thermoforming temperature of about 95° C. of the sheet should be preferably ≥1 to 5 sec., preferably <5 sec., at mould temperatures respectively tool temperatures of about 100° C. With a mould time for the thermoformed container of less than the lower limit the crystallization of the thermoformed sheet or film containing the PLLA or PLA and the nucleating composition tends to be insufficient and by contrast by exceeding the upper limit the cycle times are not sufficient short.

In detail, the inventive thermoformed, essentially biobased and optionally biodegradable containers, especially food containers like cups or lids used as closures, preferably for the complementary lids for the inventive containers, preferably for the cups, are produced in the following way preferably:

The inventive thermoformable composition containing the thermoformable resin a), PLLA or PLA, and the nucleating combination b), stored under dry conditions and mixed in an extruder, is extrusion molded through a flat dye into a sheet or optionally multilayered film according to cast extrusion preferably at a temperature of 180° C. at maximum. Such sheet or film is either stored intermediately and then thermoformed or in line thermoformed into containers, preferably cups, preferably by deep drawing, according to known methods like vacuum deep drawing or pressure deep drawing, optionally by means of a plug.

As far as such a multilayered film is used to manufacture inventive food containers, especially cups, the multilayered film, preferably a two-layered film, is prepared by cast extruding the inventive thermoformable composition containing a thermoformable resin a) and the nucleating composition b) as one layer and preferably as second layer a layer of a thermoformable resin consisting of PLLA or PLA, which becomes after the thermoforming into the containers, preferably into cups, the inside surface of the inventive containers, preferable of the cups, respectively the inner surface of lids being thermoformed of said film. After thermoforming by means of deep drawing, the containers or lids are separated, preferably cut out from the remaining sheet or film to obtain the single products, namely containers, like cups, or lids.

According to the thermoforming process by preferably cast extrusion, the extruded sheet respectively film is cooled to preferably at least 100° C., more preferably to a temperature in a range of about 65° C. to about 50° C., preferably by quenching, before it is thermoformed by deep drawing into the inventive containers, preferably cups, which are separated from the remaining sheet by cutting, preferably continuously.

The inventive thermoformed, essentially biodegradable containers, preferably the cups or lids, preferably thermoformed complementary lids, are not only essentially biobased and optionally biodegradable, but also have an excellent resistance against deformation up to a temperature of at least 93° C. and therefore can be used for providing hot liquid beverages without losing their shape.

In order to improve the handling of the inventive container, especially the inventive cup when filled with hot or cold liquids, especially beverages, at least part of the outside surface of the sidewall, preferably at least the area for gripping the container, especially the cup, are thermoformed circumferentially as corrugated surface with wavepeaks, extending in straight lines vertically to the bottom area of the container, preferably of the cup, for easier gripping and to improve hoop strength. Preferably, the height of each of these wavepeaks declines continuously from the gripping area to the bottom area of the container, especially the cup.

It is also possible to provide the inventive container, especially the inventive cup, with a handling help by arranging an external sleeve with such corrugated surface circumferentially around at least such part of the sidewall of an inventive container, especially inventive cup as described before. The corrugated surface of such sleeve functions as the outside surface of the container, respectively cup, after combining the sleeve with the container. Such sleeve can be thermoformed of an inventive composition as described before, of PLLA or PLA only or of cardboard.

Quite unexpected, the inventive thermoformed containers produced from the inventive compositions can be produced with a considerable, e.g. up to 20% improved yield especially at a temperature of about 100° C. of the tool since the inventive thermoformable composition containing a thermoformable resin a) and the nucleating composition b) provides not only an increased rate of crystallization, but also provides an at least about 20% to 30% broader window for thermoforming in comparison to a thermoformable resin a) without any nucleating combination, which broader window for thermoforming allow improved short cycle times.

EXAMPLES a) Container Production

Each of the thermoformable compositions set forth in the following tables 1 and 2 were mixed and molded in an extruder at a temperature of about 190° C. from the feed-in to the flat dye through which each molded composition was extruded as a sheet and cooled to about 50° C. by means of calendars to a sheet with a thickness of 900 μm. Each sheet was converted into cups by means of a horizontally working deep drawing machine. Thereby, the sheet was thermoformed at a temperature of about 95° C. into cups by means of a deep drawing equipment having a tool temperature of 100° C.

The thermoformed cups were cut out of the remaining sheet by conventional equipment continuously.

b) Physical Properties of the Containers Produced

Of each thermoformable composition set forth in the tables 1 and 2 the E-modulus was determined.

Accordingly the E-modulus was measured according to ISO 294-1. Therefore, flexural bars (4*10*80 mm) of each composition were produced by injection moulding with help of a DEMAG Ergotech NC IV 25-80 compact machine. Processing parameters were as usual. Samples were conditioned at least 1 week at 20° C., 50% RH prior to annealing the samples for 4 hours at 110° C. (between iron plates). Thereafter, the samples were inserted in a 93° C. test chamber to acclimatize for least 1 hour prior to testing. The E-modulus (3 pnt. bending) was determined using a Zwick Allround line 10 kN mechanical testing machine according to ISO 178 with the specifications:

Temperature: 93° C.
E-Modulus speed: 1 mm/min
Test speed for strength: 10 mm/min The corresponding results are also set forth in the tables 1 and 2.

c) Polymers Used

A PLLA with less than 1% D-lactoyl-units has a $M_n$ of $152 \cdot 10^3$ g/mol (relative to PS standards measured by GPC [gel permeation chromatography] in chloroform) and a MFI of 4.5+/−0.3 [g/10 min] (190° C./2.16 kg) according to ASTM-D 1238 was used.

A PDLA was less than 1% of L-lactoyl-units and a $M_n$ of $120 \cdot 10^3$ g/mol (relative to PS standards measured by GPC in chloroform) and a MFI of 7.5+/−0.2 [g/10 min] (190° C./2.16 kg) according to ASTM-D 1238 was used.

The PLA used is defined in table 2.

TABLE 1

| Number | PLA type | D-lactoyl unit content | Nucleating Combination | | E-modulus 1 mm/min [MPa] at 93° C. | E-modulus 10 mm/min [MPa] at 93° C. | Minimal moulding time needed (sec) |
|---|---|---|---|---|---|---|---|
|  | polystyrene | — | — |  | 330 | 908 |  |
| 220710-V | PLLA | <0.1% | 5% PDLA | — | 474 | 537 | 3 |
| 280311-IV | PLLA | <0.1% | 5% PDLA | 20% chalk | 465 | 618 | 5 |
| 050711-V | PLLA | <0.1% | 2.5% PDLA | — | 450 | 525 | 10 |
| 050711-VI | PLLA | <0.1% | 2.5% PDLA 20% Kaolin | — |  | 850 | 5 |
| 050711-VII | PLLA | <0.1% | 2.5% PDLA 20% Kaolin | 0.25% talc |  | 850 | 2 |
| 050711-VIII | PLLA | <0.1% | 2.5% PDLA 20% Kaolin | 0.5% talc |  | 850 | 1 |

Masterbatch (MB) used: 72% PLLA + 3% PDLA + 25% talc

TABLE 2

| Number | PLA type | D-lactoyl unit content | Nucleating Combination | | E-modulus 1 mm/min [MPa] at 93° C. | E-modulus 10 mm/min [MPa] at 93° C. | Minimal moulding time needed (sec) |
|---|---|---|---|---|---|---|---|
| 260308-X | PLA | 1.4% | 5% PDLA | — | 286 | 326 | 30 |
| 220611-IV | PLA | 1.4% | 3% PDLA 20% Kaolin | — | | 687 | 30 |
| 220611-VII | PLA | 1.4% | 3% PDLA 20% Kaolin | 2% talc (=8% MB) | | 710 | 20 |
| 050711-III | PLA | 1.4% | 3% PDLA 20% Kaolin | 6% talc (=24% MB) | | 710 | 1 |

Masterbatch (MB) used: 72% PLLA + 3% PDLA + 25% talc

The invention claimed is:

1. A thermoformable composition consisting of:
   (a) at least one poly-L-lactide with less than 1 mol % of D-lactoyl units (PLLA) or at least one poly-L-lactide with from 1 mol % to 5 mol % of D-lactoyl units (PLA) as thermoformable, biodegradable resin,
   (b) a nucleating combination of
      α) 0.5 to 5% by weight, based on the total amount of the thermoformable resin a), of PLLA/PDLA or PLA/PDLA stereocomplex crystallites in a molar ratio of 1:1,
      β) 0.1 to 25% by weight, based on the total amount of the thermoformable resin a), of an inorganic nucleating agent, and
      γ) greater than 10 to less than 30% by weight, based on the total amount of the thermoformable resin a), of at least an inorganic filler with lamellar structure, and
   (c) optionally, one or more additives selected from the group consisting of UV stabilizers, heat stabilizers, anti-oxidants, flame retardants, impact modifiers, plasticizers, rheology modifiers, antistatic agents, mold release agents, lubricants, and degassing agents,
   wherein the component (γ) is always a different compound than any inorganic nucleating compound used as component (β).

2. The thermoformable composition as claimed in claim 1 wherein the thermoformable resin PLA is a copolymer of L-lactide units with up to 2.5 mol % D-lactoyl-units.

3. The thermoformable composition as claimed in claim 1 wherein the nucleating combination b) is comprised of 0.5 to 3% by weight of stereocomplex crystallites PLLA/PDLA or of PLA/PDLA in a molar ratio of 1:1 as component α, of 1 to 20% by weight of talc as component β) and of 10 to 25% by weight of at least one lamellar clay mineral as component γ), each based on the total amount of the thermoforming resin a).

4. The thermoformable composition as claimed in claim 3, wherein the talc has an aspect ratio of 2 to 150.

5. The thermoformable composition as claimed in claim 1, wherein the nucleating combination b) is comprised of 0.5 to 3% by weight of stereocomplex crystallites of PLLA/PDLA or PLA/PDLA in a molar ratio of 1:1 as component α, of 1 to 20% by weight of talc as component β) and of 10 to 25% by weight of at least one lamellar clay mineral as component γ), each based on the total amount of the thermoformable resin a).

6. The thermoformable composition as claimed in claim 5, wherein the lamellar clay mineral is a lamellar aluminum mineral.

7. The thermoformable composition as claimed in claim 1 wherein component (β) comprises talc.

8. The thermoformable composition as claimed in claim 7 wherein component (γ) comprises a lamellar clay mineral.

9. The thermoformable composition as claimed in claim 1, wherein the nucleating combination b) is comprised of about 3% by weight of stereocomplex crystallites of PLA/PDLA as component α, about 6% by weight of talc as component β), and about 20% by weight of Kaolin as component γ), each based on the total amount of the thermoformable resin a).

10. The thermoformable composition as claimed in claim 1, wherein the nucleating combination b) is comprised of about 2.5% by weight of stereocomplex crystallites of PLLA/PDLA as component α, about 0.25% by weight of talc as component β), and about 20% by weight of Kaolin as component γ), each based on the total amount of the thermoformable resin a).

11. The thermoformable composition as claimed in claim 1, wherein the nucleating combination b) is comprised of about 2.5% by weight of stereocomplex crystallites of PLLA/PDLA as component α, about 0.5% by weight of talc as component β) and about 20% by weight of Kaolin as component γ), each based on the total amount of the thermoformable resin a).

12. A thermoformed, essentially biobased container formed of the thermoformable composition of claim 1.

13. The thermoformed container as claimed in claim 12, wherein the container has a resistance against deformation up to a temperature of 100° C.

14. The thermoformed container, as claimed in claim 12, obtained by molding the thermoformable composition at a temperature of 180° C. at maximum into a sheet or optionally into a multilayered film, and thermoforming said sheet or film by means of vacuum deep drawing or pressure deep drawing into containers, and optionally into complementary lids as closures for the containers.

15. The thermoformed container as claimed in claim 12, wherein the container is an essentially biobased cup.

16. The essentially biobased cup of claim 15, wherein said cup has a shape of its outside surface or means on its outside surface for gripping and improved hoop strength, optionally in combination with a complementary lid as closure.

17. A thermoformed, essentially biobased lid formed of the thermoformable composition as claimed in claim 1.

18. A closure for a thermoformed container, comprising the lid of claim 17.

* * * * *